US005338264A

United States Patent [19]

Kempf

[11] Patent Number: 5,338,264

[45] Date of Patent: Aug. 16, 1994

[54] COMPLIANT SHEAVE

[75] Inventor: Dale Kempf, Clovis, Calif.

[73] Assignee: Lift-U, Division of Hogan Mfg., Inc., Escalon, Calif.

[21] Appl. No.: 922,844

[22] Filed: Jul. 31, 1992

Related U.S. Application Data

[63] Continuation-in-part of Ser. No. 629,117, Dec. 17, 1990, Pat. No. 5,224,722.

[51] Int. Cl.5 .................... F16H 7/00

[52] U.S. Cl. .................... 474/168; 474/157

[58] Field of Search .................... 474/156-157, 474/166-168, 170, 174; 280/166

[56] References Cited

U.S. PATENT DOCUMENTS 880,988 3/1908 Hall .
2,154,107 4/1939 Nystrom .................... 105/447
3,805,630 4/1974 Cornair et al. .................... 74/89.21
4,058,021 11/1977 Wood .................... 74/229
4,058,228 11/1977 Hall .................... 214/77 R
4,081,055 3/1978 Johnson .................... 182/2
4,197,766 4/1980 James .................... 74/611
4,503,722 3/1985 Suzuki et al. .................... 74/96
4,526,251 7/1985 Johannson .................... 187/9 R
5,170,883 12/1992 Ledet et al. .................... 474/157 X
5,224,722 7/1993 Kempf .................... 474/157 X

*Primary Examiner*—Thuy M. Bui
*Attorney, Agent, or Firm*—Christensen, O'Connor, Johnson & Kindness

[57] ABSTRACT

A sheave is provided with a compliant contact surface such that the sheave is suitable for use with a leaf chain in applications in which the leaf chain is subjected to more than simply a straight tensile pull. Since the sheave contact surface is compliant, any chain leaves that protrude inwardly against the sheave will embed themselves, thus allowing any non-protruding leaf edges to come into contact with the sheave and share the load. In a preferred embodiment, compliancy of the contact surface is obtained by providing a plurality of closely spaced parallel grooves on at least those parts of the contact surface that contact the chain.

11 Claims, 3 Drawing Sheets

30
32
36
38
50
52
54
60
62
70
72
74
76
78
80
82
84
86
88
100
100a
100b
100c
102
104
106
108
110
112
120
122
124
126
130
132
134
136
138

COMPLIANT SHEAVE

Cross-References

This is a continuation-in-part of co-pending application Ser. No. 07/629,117, filed Dec. 17, 1990 now U.S. Pat. No. 5,224,722.

FIELD OF THE INVENTION

The present invention relates to a sheave for use with a chain, and more particularly to a compliant sheave for use with a leaf chain.

BACKGROUND OF THE INVENTION

Platform-type wheelchair lifts of the type disclosed in U.S. Pat. No. 4,058,228 to Hall have been used extensively in passenger vehicles, particularly urban buses. Platform lifts of the type disclosed in the Hall patent are typically installed in one of the existing stairwells in a vehicle. These lifts generally comprise a platform which is slidably mounted in the vehicle beneath the stairwell so as to define the bottom step of the stairwell when in the retracted position and so as to provide a platform which projects outwardly from the stairwell when in the extended position. The platform is attached via a parallelogram linkage assembly to a carriage. The latter is slidably mounted in a pair of opposing channel members and is caused to move between retracted and extended positions by a chain drive assembly which is actuated by a hydraulic or pneumatic linear actuator. The parallelogram linkage assembly is designed to cause the platform to move between upper and lower positions relative to the carriage when the platform is in the extended position. The parallelogram linkage includes two pairs of parallel linkage arms, each arm having a proximal end which is pivotally mounted to the carriage and a distal end which is pivotally mounted to the platform.

The linkage arms are caused to pivot about their proximal ends, thereby causing the platform to move between upper and lower positions, by a sprocket and chain drive assembly. This assembly includes a toothed driving sprocket coupled with the proximal end of one of the parallel arms so as to rotate with the arm and a driven toothed sprocket attached to the proximal end of the other arm so as to rotate with the arm. Rotational drive is transmitted from the driving sprocket to the driven sprocket by a chain drive assembly comprising a single length of roller chain. One end of the roller chain is wrapped partially around and is attached to the driving sprocket, and the other end of the roller chain is wrapped partially around and is attached to the driven sprocket. The driving sprocket is driven by a separate chain and sprocket drive assembly which is actuated by a linear actuator. In an alternative embodiment of the above-described chain drive assembly, two lengths of roller chain are employed, each of which is wrapped around a respective one of the sprockets. Two turnbuckles are provided for coupling the ends of the roller chains together so as to form a continuous flexible drive member. A preload can easily be applied to a chain assembly of the alternative embodiment by appropriate adjustment of the turnbuckles.

Platform lifts of the type described above have been used extensively in urban buses with very favorable results. Recently, the need has arisen (a) to increase the length of the parallel linkage arms of known platform lifts, (b) to increase the size and hence weight of the platform of known platform lifts, and (c) to accommodate heavier loads on known platform lifts. However, due to space limitations inherent in the design of the above-described platform lifts, it has not been possible to accommodate roller chain in the chain and sprocket drive assembly of such lifts of a size and hence strength sufficient to permit the lift to be modified in the manner described in the preceding sentence.

Under conventional operation, the parallel arms of platform lifts of the type disclosed in U.S. Pat. No. 4,058,228 are caused to travel between a downwardly projecting position, through a horizontal position, to an upwardly projecting position. As the arms travel through the horizontal position, the tendency exists for the platform of the lift to "buck" or bounce. Such "bucking" is believed to occur due to stretching of the inherently flexible roller chains used in the chain and sprocket drive assembly which arises when the load applied to the roller chains is shifted from the linkage assembly to the chains as the parallel arms move from the upwardly projecting to the downwardly projecting positions, or vice versa. As those who have experienced anomalous vibration or bouncing of elevators can appreciate, such "bucking" of the platform lift can be very disconcerting to a wheelchair occupant positioned on the lift.

In an attempt to minimize the "bucking" of the platform of conventional platform lifts which occurs as the parallel arms travel through the horizontal position, a significant preload has been applied to the roller chains. Although such preloading does reduce the tendency of the platform to "buck," it simultaneously increases the load on the bearings and the strain on the chain, sprockets, and other components of the chain and sprocket drive assembly. Also, the friction between movable components of the chain and sprocket drive assembly is increased as a consequence of such preloading. Such increases in load, strain, and friction result in added maintenance costs and reduced product longevity.

In fields of technology completely unrelated to platform lifts, leaf chains have been used for transmitting motion from one movable element to another. For instance, U.S. Pat. No. 4,197,766 discloses a counterbalanced pumping system comprising a vertically movable pump member, a counterweight, and a leaf chain supported on a plurality of pulleys for transmitting motion between the pumping member and the counterweight. U.S. Pat. No. 4,526,251 discloses a leaf chain designed for use in a lift truck for transmitting motion from one end of a hydraulic cylinder to the fork of the lift truck. In the chain drive assemblies of both U.S. Pat. Nos. 4,197,766 and 4,526,251, the ends of the leaf chains are secured to fixed or movable members, as the case may be, and the length of the leaf chains are supported by and passes back and forth over one or more sheaves or pulleys.

Although in general leaf chain is not designed to transmit positive drive, it is known to use leaf chain in this manner. U.S. Pat. No. 4,058,021 comprises a drive assembly comprising a leaf chain having link edges which engage specially formed flutes on an associated pulley. As indicated in U.S. Pat. No. 4,058,021, only a limited quantity of torque may be transmitted between the chain and pulley before the chain will slip with respect to the pulley.

It is also known to use chain in a spring-biased counterweight assembly for reducing the force required to raise a railroad passenger car stairway assembly. Such use of a chain is disclosed in U.S. Pat. No. 2,154,107, although the type of chain employed, i.e., roller versus leaf chain, is not disclosed.

Although the use of leaf chains in a wide range of mechanical contexts is well known, as evidenced by the patents discussed above, platform lifts of the type disclosed in U.S. Pat. No. 4,058,228 have, since their inception, suffered from the lack of chain strength and "bucking" problems discussed above. Such drawbacks of these platform lifts have gone uncorrected for over ten years, in spite of extremely widespread use of such platform lifts.

Thus, a strong need exists for a sprocket and chain drive assembly for causing the parallel arms of platform lifts of the type disclosed in U.S. Pat. No. 4,058,228 to Hall to move between the upper and lower positions which (a) is stronger than the sprocket and chain drive assemblies currently employed, (b) does not cause the platform to "buck" as the parallel arms move through the horizontal position, and (c) does not require excessive preloading of the roller chain links of the sprocket and chain drive assembly to avoid such "bucking" of the platform.

As discussed previously, leaf chain typically is used as a high strength tensile member. In order that every leaf in each set of leaves (the parallel link plates in each pitch of chain) carries an equal amount of a load, the distance between pin holes in each of the leaves must be precisely the same. This equalizes stresses in the ends of the leaves and loads the pin in even shear instead of bending. However, while pin hole spacing is closely controlled, precise centering of the pin holes in the circular ends of the leaves is not done. Thus, eccentric leaf ends occasionally result. Moreover, irregularities may occur during the forming of the leaves. Leaves typically are stamped from sheet metal. This process is prone to size variations and to leaf edges that are "broken."

When eccentric and off-size leaves are assembled into a set, one or more leaf edges may protrude substantially laterally from the rest of the set. As long as the leaf chain is subjected only to a straight tensile pull, the lack of precision of the link edges is of no consequence. However, in applications in which the leaf chain changes direction around a sheave, or is anchored to a sheave and partially wrapped around it, any leaf of the chain that protrudes inwardly against the sheave will carry a disproportionate amount of the load. This raises the tensile stresses in the leaf and induces bending into the associated pin. A sheave that will enable all leaves of the chain to carry a load equally, despite irregularities in the leaves, is desirable.

SUMMARY OF THE INVENTION

The present invention is a leaf chain drive assembly designed for use with a platform lift of the type comprising a platform, a carriage assembly, and a linkage assembly coupled with the platform and the carriage assembly for causing the platform to move upwardly and downwardly along a circular arc relative to the carriage. The linkage assembly comprises first and second linkage arms, with the proximal end of the first linkage arm being pivotally mounted to the carriage so as to be rotatable about a first axis and the proximal end of the second linkage arm being pivotally mounted to the carriage so as to be rotatable about a second axis. The leaf chain drive assembly comprises first sheave and second sheaves, each comprising a radially projecting lug. The first sheave is coupleable with the first linkage am so as to rotate with the first linkage arm about the first axis, and the second sheave is coupleable with the second linkage arm so as to rotate with the second linkage arm about the second axis. The leaf chain drive assembly also comprises two leaf chains which are coupled together so as to surround and engage the first and second sheaves. The leaf chains each comprise an extended connecting link designed to engage the radially projecting lugs on the first and second sheaves so as to permit rotational drive to be transmitted between the first and second sheaves and the leaf chains.

The leaf chain drive assembly further comprises a third sheave coupled to rotate with the first sheave, and a third leaf chain wrapped around the third sheave. One end of the third leaf chain is attached to the third sheave, and the other end of the third leaf chain is attached to a linear actuator. As the linear actuator causes the other end of the third leaf chain to reciprocate, the third leaf chain will cause the third sheave to rotate, thereby imparting rotational drive to the first sheave which is coupled with the third sheave.

The present invention also provides a sheave for use with a leaf chain in cases in which the leaf chain is subjected to more than simply a straight tensile pull, e.g., applications in which the leaf chain changes direction around a sheave, or is anchored to a sheave and partially wrapped around it. More specifically, the present invention provides a sheave having a compliant chain contact surface so that any protruding leaf edges will embed themselves, thus allowing the non-protruding leaf edges to come into contact with the sheave and share the load.

In a situation in which the leaf chain is anchored to the sheave, as in the drive assembly described herein, any protruding leaf edge will always contact the sheave at the same location. Upon the first application of the working load, the sheave surface must indent to conform to the lateral surface of the chain. A protruding edge will then engage a respective "pocket" on the sheave during each subsequent cycle. Thus, the sheave needs only to comply plastically; elasticity of the sheave surface is not required.

In a preferred embodiment, the sheave has a series of grooves around the circumference thereof so that the sheave surface is plastically compliant. The grooves may extend around the entire chain contact surface of the sheave or may be provided at intervals corresponding to the ends of the chain links, i.e., the parts of the chain that contact the sheave.

BRIEF DESCRIPTION OF THE DRAWINGS

The present invention will be described in conjunction with the accompanying drawings, wherein.

DETAILED DESCRIPTION OF THE PREFERRED EMBODIMENT

Figure 1:
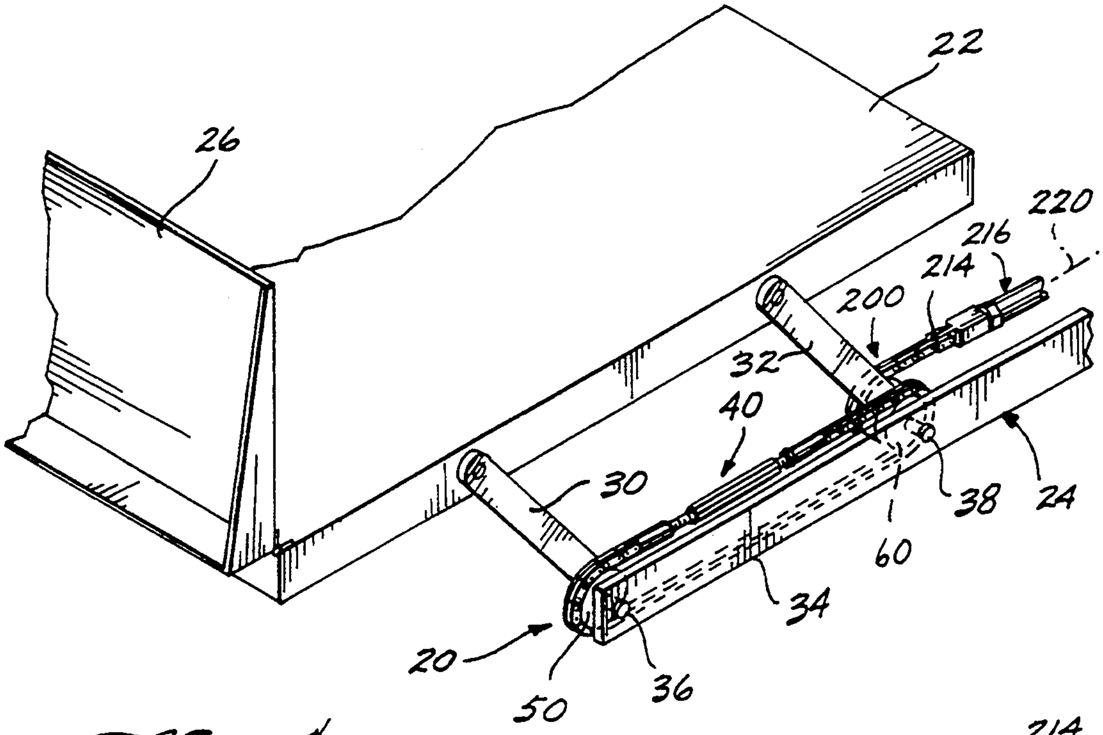
FIG. 1 is a fragmented, perspective view of a portion of a platform lift incorporating the chain drive assembly of the present invention, with the parallel arms of the lift being shown in the upwardly projecting position.

The present invention is a leaf chain drive assembly 20 which is designed to replace roller chain drive assemblies of the type used in platform lifts disclosed in U.S. Pat. No. 4,058,228 to Hall, which lifts shall be referred to hereinafter as "platform lifts." FIG. 1 illustrates a conventional platform lift and one embodiment of the leaf chain drive assembly of the present invention incorporated in such lift. As described in detail in U.S. Pat. No. 4,058,228, which is incorporated herein by reference, and as illustrated in FIG. 1, conventional platform lifts include a platform 22 for supporting a passenger such as a wheelchair occupant, and a carriage, one portion of which is identified at 24, for causing the platform to move horizontally between the retracted and extended positions. Platform lifts also typically include a barrier 26 which is pivotally mounted to the outboard end of platform 22. Barrier 26 forms the bottom step in the stairwell in which the platform lift is mounted when the lift is in the retracted position. When the lift is in the extended position, barrier 26 is typically maintained in the position illustrated in FIG. 1 so as to prevent a wheelchair positioned on platform 22 from rolling off the platform.

Platform lifts further comprise a parallelogram linkage assembly for causing platform 22 to move upwardly and downwardly along a circular arc when the platform is in the extended position. This linkage assembly comprises two pairs of parallel arms, one pair of which is illustrated in FIG. 1 and comprises linkage arms 30 and 32. The proximal ends (i.e., the lower ends as illustrated in FIG. 1) of linkage arms 30 and 32 are keyed to pivot shafts 36 and 38, respectively, which shafts are pivotally mounted in spaced relation to carriage bar 34. As a consequence of this arrangement, the proximal ends of linkage arms 30 and 32 are coupled to carriage 34 so as to rotate about the pivot axes of pivot shafts 36 and 38, respectively. The distal ends (i.e., the upper ends as illustrated in FIG. 1) of linkage arms 30 and 32 are pivotally mounted to platform 22 so that the spacing between the distal ends of the arms is identical to the spacing between the proximal ends of the arms.

As described in detail below, leaf chain drive assembly 20 is designed to cause linkage arms 30 and 32 to pivot with pivot shafts 36 and 38, respectively, about the pivot axes of the shafts, thereby causing platform 22 attached to arms 30 and 32 to raise and lower. As described below, leaf chain drive assembly 20 includes slave chain drive assembly 40 and lift chain drive assembly 200 for causing arms 30 and 32 to pivot in this manner.

Referring to FIGS. 1–6, slave chain drive assembly 40 comprises a driven sheave or pulley 50 having identically sized and shaped lugs 52 and 54 which are spaced apart from one another a predetermined distance and project along a common radius of the sheave a predetermined distance from the outer circumferential edge of the sheave 50. The specific size, configuration, and relative spacing of projecting lugs 52 and 54 will be described in greater detail below in connection with the description of leaf chain 120. Sheave 50 is keyed to pivot shaft 36 so as to rotate with the pivot shaft.

Slave chain drive assembly 40 includes a driving sheave 60 which preferably has a size and configuration identical to that of sheave 50. Thus, sheave 60 includes a pair of axially spaced, radially projecting lugs, one of which is identified in phantom at 62 in FIG. 3, which are identical to lugs 52 and 54 of sheave 50. Sheave 60 is keyed to pivot shaft 38 so as to rotate with the pivot shaft.

Assembly 40 comprises an endless drive assembly 70 for transmitting rotational drive from driving sheave 60 to driven sheave 50. In the preferred embodiment, drive assembly 70 comprises a leaf chain 72. Leaf chain 72 is a so-called "3–4" leaf chain comprising a plurality of rigid plates which are interconnected by pins 74. More specifically, moving from the top to the bottom of leaf chain 72 illustrated in FIG. 4, the leaf chain comprises outer plates 76, intermediate plates 78 and 80, central plates 82, intermediate plates 84 and 86, and outer plates 88. The ends of each outer plate 76 are aligned with the ends of a corresponding respective inner plate 82 and a corresponding respective outer plate 88. Similarly, the ends of a given set of intermediate plates 78, 80, 84, and 86 are aligned with one another. In addition, each set of intermediate plates 78, 80, 84, and 86 is offset one pitch from the associated set of outer, central, and outer plates 76, 82, and 88. This design of leaf chain 72 is preferred, although it is to be appreciated that leaf chains having differing plate configurations may also be satisfactorily employed, the only requirement being that the leaf chain have sufficient strength and axial stiffness for the intended application, and the cross-sectional size of the leaf chain is such that it can be accommodated in the space provided in the platform lift.

Leaf chain 72 also comprises an extended connecting link 100 which is preferably, although not necessarily, positioned at or near the middle of the length of the leaf chain. The extended connecting link comprises an outer plate 100*a* which is positioned along the plane of outer plates 76, an intermediate plate 100*b* which is positioned along the plane of central plates 82, and an outer plate 100*c* which is positioned along the plane of the outer plates 88. With this design of connecting link 100, apertures 102 and 104 are provided in leaf chain 72, which apertures extend entirely through the thickness of the chain. Apertures 102 and 104 in leaf chain 72 are sized and configured, as are the radially projecting lugs (one of which is identified at 62 in FIG. 3) of sheave 60, so that the radially projecting lugs may be received in apertures 102 and 104 with a close sliding fit, whereby rotational motion may be transmitted from sheave 60 to leaf chain 72 without any lost motion.

Leaf chain 72 additionally comprises end fitting 106 which is attached to one end of the leaf chain and end fitting 108 which is attached to the other end of the leaf chain. End fitting 106 comprises a threaded central bore 110 (FIG. 4) having a left-hand thread, and end fitting 108 comprises a threaded central bore 112 (FIG. 4) having a right-hand thread.

Endless drive belt assembly 70 additionally comprises a second leaf chain 120. Leaf chain 120 is identical to leaf chain 72, and hence comprises an extended connecting link 122 which is identical to connecting link 100, and end fittings 124 and 126 which are identical to end fittings 106 and 108, respectively. Thus, connecting link 122 is designed to receive lugs 52 and 54 of sheave 50 such that motion may be transmitted from the leaf chain to the sheave.

Drive belt assembly 70 further comprises connecting shafts 130 and 132. Shaft 130 comprises a central portion 134, having a hexagonal cross-sectional configuration and threaded ends 136 and 138. Threaded end 136 has a left-hand thread and the pitch of the thread is selected so that end 136 may be threadably engaged in threaded bore 110 in end fitting 106 of leaf chain 72. End 138 has a right-hand thread, and the thread pitch of the end is selected so that it may be threadably engaged in the central bore in end fitting 126 of leaf chain 120. Connecting shaft 132 has a similar construction with the end having a right-hand thread being threadably engaged in central bore 112 in end fitting 108 of leaf chain 72, and the end having a left-hand thread being threadably engaged in the central bore of end fitting 124 of leaf chain 120.

Figure 2:
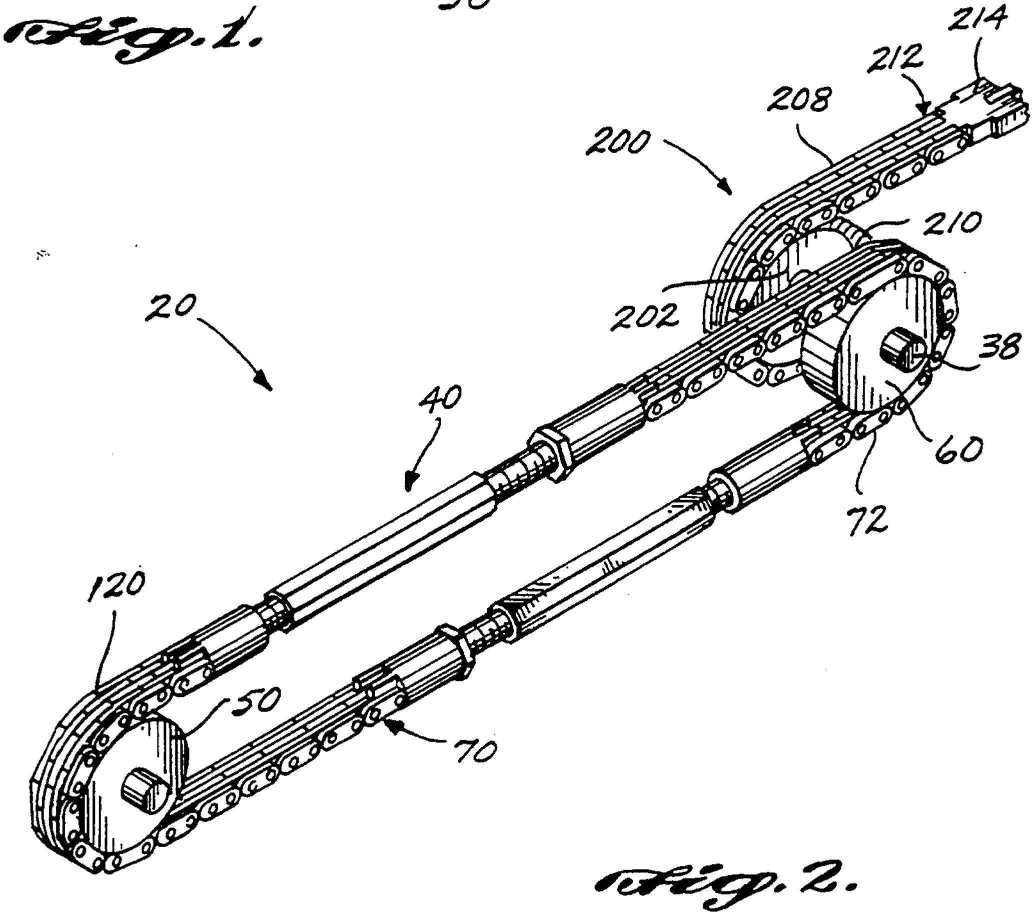
FIG. 2 is an enlarged perspective view of the chain drive assembly illustrated in FIG. 1, with associated portions of the platform lift being removed for clarity of illustration.
Figures 3, 4, 5, 6:
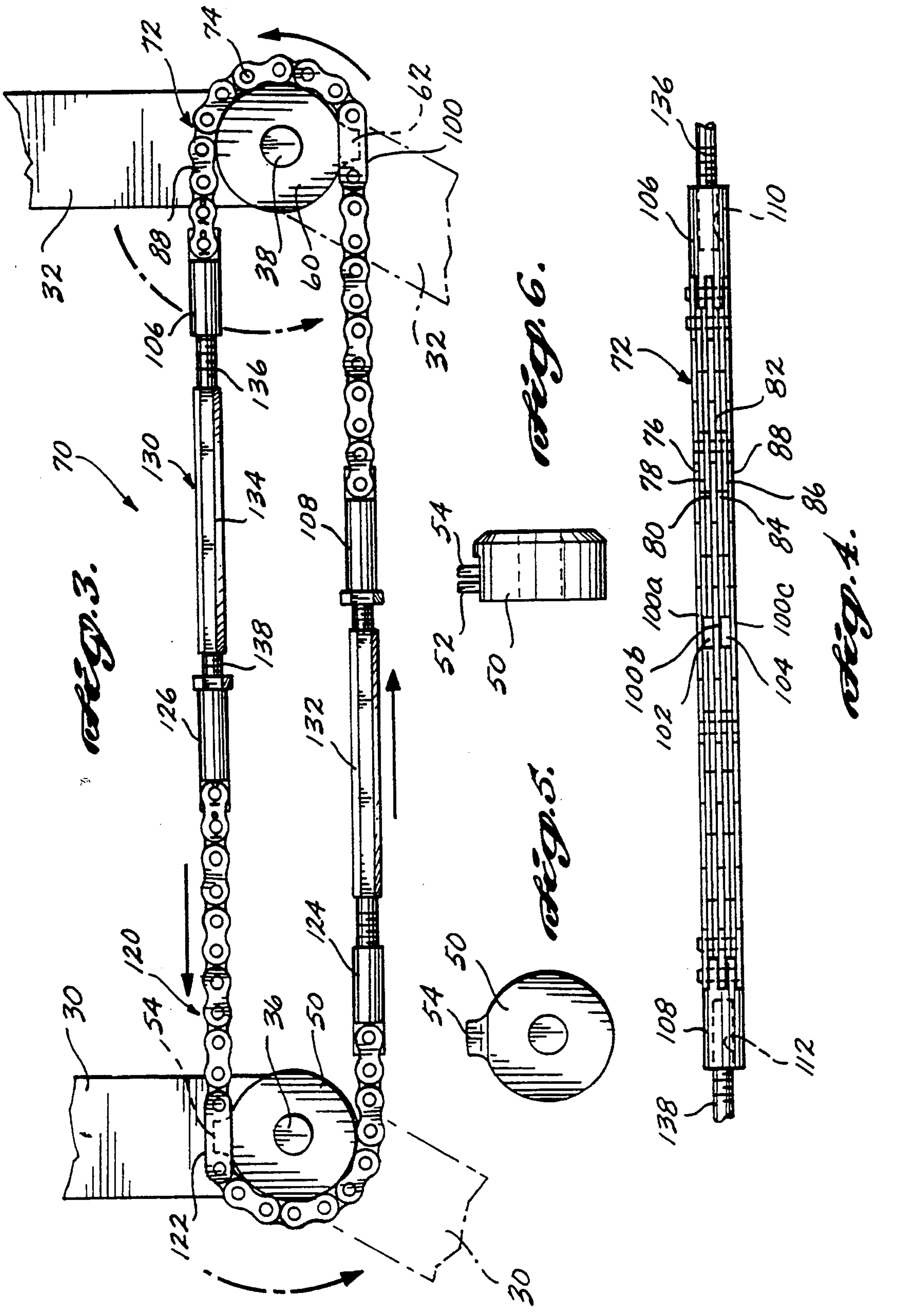
FIG. 3 is a side elevational view of the chain drive assembly with the parallel arms of the platform lift which are driven by the chain drive assembly being shown in solid view in an upwardly projecting position and in phantom view in a downwardly projecting position.
FIG. 4 is a top view of one of the lengths of leaf chain used in the chain drive assembly, with the chain being spread out flat for clarity of illustration.
FIG. 5 is a side elevation view of one of the sheaves used in the leaf and chain drive assembly.
FIG. 6 is a front elevational view of the sheave illustrated in FIG. 5.

Referring to FIGS. 1 and 2, the leaf chain drive assembly 20 further comprises a lift chain drive assembly 200 for causing sheave 60 to rotate. The lift chain drive assembly comprises a sheave 202 which is keyed to pivot shaft 38 so as to rotate with the shaft. As illustrated in FIG. 1, linkage arm 32 is positioned between sheave 202 and sheave 60, whereby sheave 202, linkage arm 32, and sheave 60 rotate as a unit about the rotational axis of pivot shaft 38.

Lift chain assembly 200 further comprises leaf chain 208. The latter is preferably a "3–4" leaf chain of the type used for leaf chains 72 and 120, as described above, except that the size and strength of leaf chain 208 are increased as required to permit leaf chain 208 to withstand the substantially greater forces to which it is subjected. End 210 of leaf chain 208 is affixed to sheave 202 by conventional means so that the end of the leaf chain will rotate with the sheave. In one embodiment of the invention, sheave 202 comprises a pair of radially projecting lugs (not shown) similar to lugs 52 and 54 on sheave 50 as described above. End 210 of leaf chain 208 is then attached to these projecting lugs via a pin (not shown). The opposite end 212 of leaf chain 208 is attached via fitting 214 to linear actuator 216. The latter is provided for causing leaf chain 208 to move back and forth so as to wrap around and unwrap from the periphery of sheave 202, thereby causing the pivot sheave to rotate about its rotational axis. Linear actuator 216 is identical to the corresponding linear actuator used in the platform lift described in U.S. Pat. No. 4,058,228. Linear actuator 216 is designed to cause end 212 of leaf chain 208 to move back and forth along actuation axis 220. For a more detailed description of linear actuator 216, attention is directed to the aforementioned patent.

In connection with the following discussion of the operation of leaf chain drive assembly 20, reference should be made to FIGS. 1–6. Initially, end 210 of leaf chain 208 is attached to sheave 202, the leaf chain is wrapped around sheave 202 in the manner illustrated in FIGS. 1 and 2, and end 212 of leaf chain 200 is attached via fitting 214 to linear actuator 216. Leaf chain 72 is wrapped around sheave 60 so that the radially projecting lugs of sheave 60 (one of which is identified at 62 in FIG. 3) are received in apertures 102 and 104 in the leaf chain. Leaf chain 120 is wrapped around sheave 50 in a similar manner so that radially projecting lugs 52 and 54 are received in the apertures of connecting link 22. Connecting shaft 130 is then threadably engaged with end fittings 106 and 126, and connecting shaft 132 is threadably engaged with end fittings 108 and 124. The connecting shafts are then tightened just enough to remove all slack from leaf chains 72 and 120. A significant preload does not have to be applied to leaf chains 72 and 120, as is typically required with the two-chain alternative embodiment (discussed above) of the chain drive assembly used with known platform lifts.

In connection with the following discussion, it is assumed that parallel linkage arms 30 and 32 are in the upwardly extending position illustrated in FIG. 1. When it is desired to move platform 22 to a more elevated position with respect to carriage 24, linear actuator 216 is actuated so as to cause end 212 of leaf chain 200 to move inwardly (i.e., to the right as illustrated in FIG. 1) along the actuation axis 220 of the linear actuator 216. As leaf chain 200 moves in this direction, it causes sheave 202 to rotate in a clockwise direction as illustrated in FIGS. 1 and 2. This clockwise rotation is transmitted via pivot shaft 38 to sheave 60 so as to cause the latter to also rotate in a clockwise direction. Additionally, rotation of sheave 202 in a clockwise direction is transmitted via pivot shaft 38 to linkage arm 32 so as to cause the pivot arm to move upwardly and in a clockwise direction about the rotational axis of pivot shaft 38.

Rotation of sheave 60 in a clockwise direction is transmitted via its radially projecting lugs, e.g., lug 62, to leaf chain 72 so as to cause the portion of the leaf chain wrapped around sheave 60 to also rotate in the clockwise direction. Such motion of leaf chain 72 is transmitted via connecting shafts 130 and 132 to leaf chain 120, thereby causing the portion of leaf chain 120 wrapped around sheave 50 to rotate in a clockwise direction. Such movement of leaf chain 120 is transmitted via its connecting link 122 to projecting lugs 52 and 54 and hence to sheave 50 so as to cause sheave 50 to rotate in a clockwise direction. This rotation of sheave 50 is transmitted via pivot shaft 36 to linkage arm 30 so as to cause the linkage arm to rotate about the rotational axis of pivot shaft 36. Thus, when sheave 202 is driven in a clockwise direction, linkage arms 30 and 32 are caused to move along a circular arc in a clockwise direction so as to cause platform 22 to raise relative to carriage 24.

On the other hand, when it is desired to lower platform 22 with respect to carriage 24, linear actuator 216 is operated so as to cause end 212 of leaf chain 200 to move outwardly (to the left as illustrated in FIG. 1) along actuation axis 220. Sheave 202 is thus allowed to rotate counterclockwise under the action of gravity. Such movement of sheave 202 causes linkage arms 30 and 32 to move in a counterclockwise direction along a circular arc so as to cause platform 22 to move outwardly and downwardly with respect to carriage 24. As a consequence of the mechanical interconnection provided by a slave chain drive assembly 40, linkage arms 30 and 32 are permitted to move downwardly in a parallel, simultaneous fashion.

While the preferred method for connecting sheaves 50 and 60 with drive belt assembly 70 comprises the connecting link and radially projecting lug arrangement described above, it is to be appreciated that other approaches for achieving such connection between the leaf chains and the sheaves also fall within the scope of the present invention.

As illustrated and described above, a leaf chain drive assembly 20 is provided on only one side of platform 22. However, in certain operating environments, it may be desirable to provide an assembly 20 on each side of platform 22.

The slave chain drive assembly 70 and lift chain drive assembly 200 of the present invention possess several important advantages over the corresponding roller chain drive assemblies of the platform lift disclosed in U.S. Pat. No. 4,058,228. The cross-sectional size of leaf chains 72, 120, and 200 is similar to that of the corresponding roller chains used in the platform lift described in U.S. Pat. No. 4,058,228 due to size constraints imposed by the environment in which the leaf chains are used. However, leaf chains 72, 120, and 200 are significantly stronger than their roller chain counterparts due to the inherently greater tensile strength of leaf chains. Consequently, the slave chain drive assembly 70 and leaf chain drive assembly 200 enjoy a significantly greater margin of safety than their roller chain counterparts used in the platform lift described in U.S. Pat. No. 4,058,228.

Although it is fairly widely known by those of ordinary skill in the art that a leaf chain of a given size has greater tensile strength than a comparably sized roller chain, few ordinary practitioners, even those specializing in the narrow art of chain engineering, appreciate that leaf chains are also axially stiffer than roller chains of corresponding cross-sectional size. Such additional stiffness is responsible for the dramatic improvement in the operation of platform lifts incorporating the slave and leaf chain drive assemblies of the present invention. More specifically, by utilizing relatively stiff leaf chains in place of their relatively flexible roller chain equivalents, the tendency of platform 22 to "buck" or bounce as parallel linkage arms 30 and 32 are caused to rotate through the horizontal position is eliminated. Elimination of such motion enhances significantly a user's sense of security when riding up or down on platform 22. Moreover, because the leaf chains of assemblies 70 and 200 do not have to be preloaded to the extent required with their roller chain counterparts used in the platform lift of U.S. Pat. No. 4,058,228, the maintenance requirements for the linkage assembly of the platform lift are reduced significantly and the longevity of the various components of the platform lift is increased significantly.

As discussed previously, leaf chain typically is used as a tension linkage. Although leaf chain sometimes is used in applications in which the leaf chain is subjected to more than simply a straight tensile pull, known sheaves for use with leaf chains in these applications have non-deformable chain contact surfaces. If the chain is irregular such that one or more leaves protrudes substantially laterally from a leaf set (the parallel plates in a chain link), the leaf set will carry a load disproportionately, since the non-protruding leaves will not contact the sheave. The present invention solves this problem by providing a sheave having a compliant contact surface that allows all leaves of a leaf set to contact the sheave and thus share a load proportionately.

Figure 7:
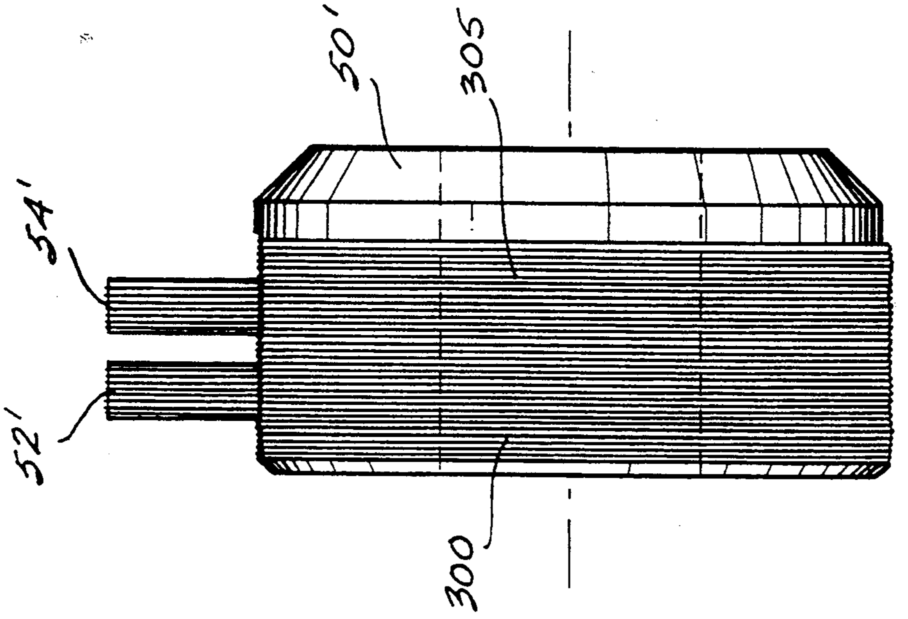
FIG. 7 is a front view of a sheave provided with grooves around the entire sheave contact surface.

The present invention provides a sheave 50' having a core and a compliant contact surface surrounding the core. As shown in FIG. 7, the sheave 50' is identical to the sheave 50 previously described except that a series of grooves 300 is provided around the entire contact surface of the sheave 50'. The grooves 300 run circumferentially around the substantially cylindrical sheave 50'. Grooves 300 preferably are also provided on the flanks of the lugs 52', 54' as well as on the radii connecting the lug flanks and the cylindrical surface of the sheave 50'. The groove crests 305 support the leaf edges. If a chain leaf protrudes inwardly against the sheave 50' relative to other leaves in the chain link, the protruding leaf will compress the associated groove crests 305 such that the non-protruding leaves of the link maintain contact with the sheave 50'. In this manner, all of the leaves of a leaf set are made to carry a load proportionately despite the presence of one or more protruding leaves.

Figure 8:
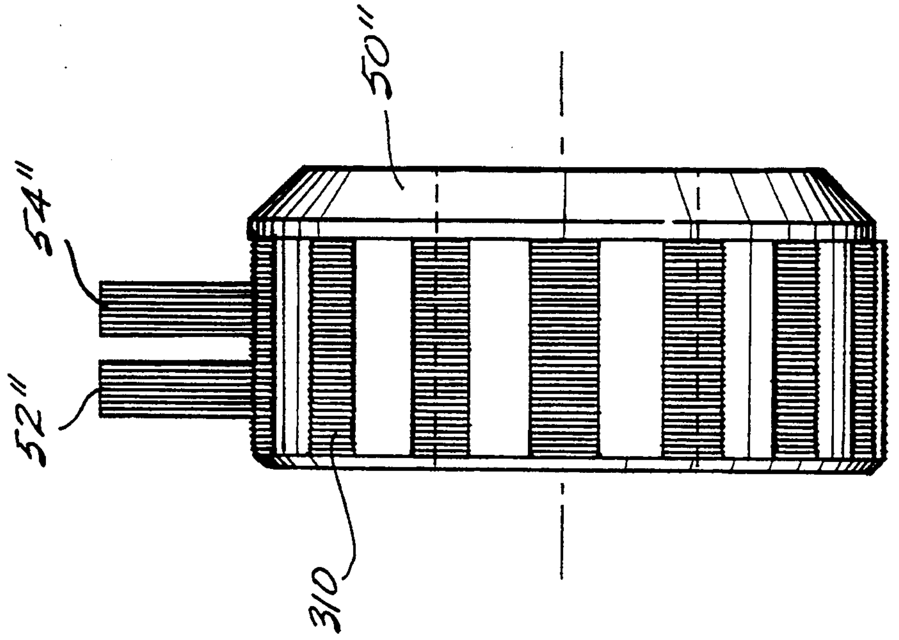
FIG. 8 is a front view of a sheave provided with grooves on the sheave contact surface at intervals corresponding to the chain link ends.

FIG. 8 shows another embodiment of a sheave 50'' in accordance with the present invention. This embodiment is similar to the sheave 50' shown in FIG. 7, except that grooves 310 are provided on the contact surface of the sheave 50'' at intervals that coincide with the leaf ends, i.e., the parts of the leaf chain that contact the sheave. This configuration has been found to simplify manufacturing and thereby reduce costs. The grooves 310 run circumferentially around the substantially cylindrical sheave 50''. Grooves 310 preferably are also provided on the flanks of the lugs 52'', 54'' as well as on the radii connecting the lug flanks and the cylindrical surface of the sheave 50''.

The grooves may be made in any manner. In the case in which the sheave is machined, it has been found preferable to form the grooves by using a thread mill to make the finishing cut. The groove dimensions and spacing may vary, depending on the configuration of the leaf chain and the applied load, but in any case, the grooves are configured to provide a deformable surface that will enable all leaves in a leaf set to contact the sheave. The groove dimensions and spacing suitable for a particular application may be determined in a conventional manner well-known to those skilled in the art. For reference purposes, it is noted that a 32-pitch, 60-degree V-groove thread milling cutter has been found to provide sufficient plastic compliance for a $\frac{5}{8}''$ pitch leaf chain having $\frac{1}{8}''$ thick plates, when the chain is loaded to 1/6 ultimate tensile strength. This cutter provides four groove crests to support each leaf edge.

The grooves may be configured so as to run parallel to the central axis of the substantially cylindrical sheave. This configuration is well-suited to a sheave that is made by laser burning thin sections of the sheave and then joining the sections together. In this case, each section may be laser profiled to have tooth-like members around the perimeter thereof such that when the sections are joined together, grooves parallel to the sheave central axis are formed on the contact surface of the sheave.

Although the sheave in accordance with the present invention has been described in connection with a leaf chain, it is envisioned that the present invention is suitable for use with any type of load-carrying element having leaf-like members. Moreover, although the sheave in accordance with the present invention is described in connection with a drive assembly for a wheelchair lift, the utility of the sheave is not so limited. Furthermore, although the preferred embodiment provides parallel grooves on the contact surface of the sheave to obtain a compliant surface, the present invention is not limited to this configuration.

The embodiments of the invention in which an exclusive property or privilege is claimed are defined as follows:

1. A sheave for use with a load carrying member having links including parallel leaves arranged such that an outer edge of each leaf is positioned adjacent the sheave during use, the sheave comprising:

a core; and an outer part surrounding the perimeter of the core, the outer part adapted to carry the load carrying member and being compliant in at least the areas of the outer part that contact the load carrying member such that when a link having at least one inwardly protruding leaf contacts the outer part, the protruding leaf deforms the outer part and every leaf in the link contacts the outer part.

2. The sheave of claim 1, wherein compliancy of the outer part is provided by a plurality of grooves formed in at least the areas of the outer part that contact the load carrying member.

3. A sheave for use with a leaf chain, comprising:

a main body having a contact surface for contacting the leaf chain, the contact surface being compliant in at least the areas of the contact surface that contact leaves of the leaf chain; and a coupling member attached to the main body and adapted to be coupled with the leaf chain.

4. The sheave of claim 3, wherein compliancy of the contact surface is provided by a plurality of grooves formed in the contact surface.

5. The sheave of claim 4, wherein the main body is substantially cylindrical and the grooves run parallel to the central axis of the substantially cylindrical main body.

6. The sheave of claim 4, wherein the main body is substantially cylindrical, the grooves run circumferentially around the substantially cylindrical main body, and adjacent grooves are spaced a distance less than the width of a leaf of the leaf chain.

7. The sheave of claim 4, wherein the grooves are provided on substantially the entire contact surface.

8. The sheave of claim 4, wherein the grooves are provided at intervals corresponding to the ends of the leaves of the leaf chain.

9. The sheave of claim 3, wherein each surface of the coupling member that contacts the leaf chain is compliant.

10. The sheave of claim 9, wherein compliancy of each surface of the coupling member that contacts the leaf chain is provided by a plurality of grooves formed in the surface.

11. A sheave for use with a leaf chain, comprising:

a substantially cylindrical main body having an outer surface for contacting the leaf chain; and a plurality of closely spaced parallel grooves formed in at least those areas of the outer surface that contact the leaf chain, wherein in use any inwardly protruding leaf of a chain link that contacts the outer surface deforms the outer surface such that each leaf of the chain link contacts the outer surface.

* * * * *